(12) United States Patent
Balasaygun et al.

(10) Patent No.: US 8,929,209 B2
(45) Date of Patent: Jan. 6, 2015

(54) QUANTUM AND PROMISCUOUS USER AGENTS

(71) Applicants: Mehmet C. Balasaygun, Freehold, NJ (US); Rajeshwari Edamadaka, Allentown, NJ (US); Harsh V. Mendiratta, Old Bridge, NJ (US); Stephen M. Milton, Freehold, NJ (US); Timothy I. Ross, Fair Haven, NJ (US)

(72) Inventors: Mehmet C. Balasaygun, Freehold, NJ (US); Rajeshwari Edamadaka, Allentown, NJ (US); Harsh V. Mendiratta, Old Bridge, NJ (US); Stephen M. Milton, Freehold, NJ (US); Timothy I. Ross, Fair Haven, NJ (US)

(73) Assignee: Avaya Inc., Basking Ridge, NJ (US)

( * ) Notice: Subject to any disclaimer, the term of this patent is extended or adjusted under 35 U.S.C. 154(b) by 145 days.

(21) Appl. No.: 13/764,496

(22) Filed: Feb. 11, 2013

(65) Prior Publication Data

US 2013/0156026 A1    Jun. 20, 2013

Related U.S. Application Data

(62) Division of application No. 12/614,562, filed on Nov. 9, 2009, now Pat. No. 8,391,138.

(51) Int. Cl.
  *G01R 31/08*    (2006.01)
  *H04L 29/08*    (2006.01)
  *H04L 12/66*    (2006.01)

(52) U.S. Cl.
  CPC .............. *H04L 67/142* (2013.01); *H04L 12/66* (2013.01)
  USPC ........................................................ 370/229

(58) Field of Classification Search
  CPC ................. H04L 65/1006; H04L 29/06027; H04L 65/1069; H04L 65/104
  USPC .................... 370/229, 231, 235, 351–430
  See application file for complete search history.

(56) References Cited

U.S. PATENT DOCUMENTS

| | | | |
|---|---|---|---|
| 6,085,086 A | 7/2000 | La Porta et al. | |
| 8,094,789 B2* | 1/2012 | Schroeder et al. | 379/88.13 |
| 8,102,861 B2* | 1/2012 | Cunetto et al. | 370/400 |
| 8,391,138 B2 | 3/2013 | Balasaygun et al. | |
| 8,401,163 B1* | 3/2013 | Kirchhoff et al. | 379/201.01 |
| 2005/0114491 A1 | 5/2005 | Bushmitch et al. | |
| 2007/0064896 A1* | 3/2007 | Chang et al. | 379/156 |
| 2008/0091452 A1* | 4/2008 | Wellons et al. | 705/1 |
| 2008/0137671 A1* | 6/2008 | Agarwal et al. | 370/401 |
| 2009/0238194 A1* | 9/2009 | Basart et al. | 370/401 |
| 2009/0245265 A1* | 10/2009 | Takeshima et al. | 370/401 |
| 2009/0296642 A1* | 12/2009 | Keller et al. | 370/329 |
| 2009/0323636 A1* | 12/2009 | Dillon et al. | 370/331 |

OTHER PUBLICATIONS

Official Action for U.S. Appl. No. 12/614,562, mailed May 7, 2012 6 pages Restriction Requirement.
Official Action for U.S. Appl. No. 12/614,562, mailed Jul. 5, 2012 8 pages.
Notice of Allowance for U.S. Appl. No. 12/614,562, mailed Oct. 19, 2012 9 pages.

* cited by examiner

*Primary Examiner* — Fan Ng
(74) *Attorney, Agent, or Firm* — Sheridan Ross P.C.

(57) ABSTRACT

A call processing system includes a call processing server. The call processing server processes calls for an internal network that employs SIP features and functions. The call processing server can receive calls from or send calls to one or more external communication endpoints that are not part of the internal network. However, the call processing server can associate a floating user agent with the communication from the external communication endpoint and lock the floating user agent to a gateway. After locking onto a gateway and initiating the call, the floating user agent can then publish call event status and receive SIP primitives similar to other SIP-enabled devices.

15 Claims, 10 Drawing Sheets

QUANTUM AND PROMISCUOUS USER AGENTS

CROSS REFERENCE TO RELATED APPLICATION

The present application is a divisional of U.S. patent application Ser. No. 12/614,562, filed Nov. 9, 2009 entitled "QUANTUM AND PROMISCUOUS USER AGENTS", which is incorporated herein by this reference in its entirety.

BACKGROUND

Many organizations and business are installing or using communication systems that use the Session Initiation Protocol (SIP). SIP communication systems provide many features that are not provided with other phone systems. Some of the features allow the communication system to interact with other computer-based applications. Thus, an application can trigger a phone call over the SIP communication system or execute other functions involving the SIP communication system.

Generally, these advanced features only function with SIP communication endpoints, that is, SIP phones connected to the SIP communication system. Thus, when a user receives a phone call from a communication endpoint, an "external device," that is outside the internal network, the external device are not represented the same and require a wholly separate interface to provide the same features as the SIP-enabled phones. The additional interfaces are difficult and expensive to create. Because external devices are not treated similarly as the SIP-enabled, internal phones, SIP communication systems may not provide the most effective communication system.

SUMMARY

It is with respect to the above issues and other problems that the embodiments presented herein were contemplated. Systems and methods are provided for associating a "floating" user agent with a communication from or to an external communication endpoint (such as a mobile phone) communicating through a network external to a SIP-enabled network. The user agent can provide SIP features to or status for the communication with the external endpoint and a SIP-enabled device. In embodiments, a new user agent is associated for each communication, and this user agent may float to one of two or more gateways. The user agent can be instantiated on a gateway between the internal SIP-enable network and the external network. Allowing the user agent to float provides the communication system the flexibility to determine the best gateway for a communication or manage incoming calls regardless of which gateway receives the call. The user agent, after being locked onto a gateway, can then report to a dialog state compositor and/or an event state compositor that can provide the status of the call to other applications or devices. The other applications and devices may then recognize and interact with the user agent. Thus, although the user agent floats, other applications and devices can discover an address for the user agent and then interact with that user agent.

With the floating user agents, communication applications do not need to discriminate between the external phones and internal phones. The floating user agents allow external devices to be represented similarly to the internal devices. Floating user agents allow communication applications to build additional features that are not otherwise possible, such as a SIP application requesting a mobile phone to initiate a new request. Further advantages include: allowing call monitoring of user agents that normally have no way to be monitored (such as user agents that handle PSTN numbers); allowing the registration event monitoring of devices that normally would not be in the event package; leveraging the existing reliability of the telephony infrastructure (e.g., the embodiments herein do not add hardware components that could compromise reliability); providing symmetry (i.e., all a user's devices provide the same interfaces to the rest of the communication system regardless of the vendor); and handling of out-of-dialog (OOD) REFER does not rely on the user agent.

The floating user agent is a user agent representing an external device in the enterprise SIP network. The floating user agent can reside on the gateway elements (at the border of the enterprise and external networks). The floating user agent's identity and mapping to a particular gateway instance is dynamically determined on a per call basis—thus, the user agent "floats." The floating user agent can have two types: a quantum user agent, which is a floating user agent that represents an external phone number of one of the enterprise users; and, a promiscuous user agent, which is a floating user agent that represents a non-enterprise (external) user.

While both the user agents may be "locked" to a particular gateway on the appearance of a call instance, only the quantum user agent offers the capability to control its behavior prior to the call. For instance, the quantum user agent can be instructed to initiate a new call, while promiscuous user agents can be controlled only during the call. In embodiments, the quantum user agent registers with the enterprise SIP proxy using an address-of-record of an enterprise user and a contact address that represents one of the external phones of the enterprise user. While registering, the quantum user agent can use the external number as the contact address. Employing the external phone number as the contact address ensures the pre-call requests from the communication applications can be routed to the appropriate gateways. In embodiments, the quantum user agent does not have a fixed location and is not active until a call request is attempted; therefore, the SIP Proxy uses a third-party registration mechanism to register with the SIP proxy. The SIP proxy can publish the registration status (e.g., the registration event package) of the quantum user agent to the interested communication applications. The quantum user agent may lock one of its instances with a particular gateway upon one of: receiving a request from a communication application to initiate a call; receiving an incoming call request from the external network; or receiving an outgoing call request towards the external network. The quantum user agent may have multiple parallel instances on the multiple gateways. Once active in a call, the locked quantum user agent can publish the call states just like any other SIP device. The locked quantum user agent can also act on the SIP primitives like the REFER method that the communication applications use to control the behavior of the quantum user agent.

Unlike quantum user agent, the promiscuous user agent may not register with the SIP proxy. The promiscuous user agent can be completely dormant until a call request arrives (incoming as well as outgoing) at one of the gateways. The promiscuous user agent may not allow the communication applications control until an instance of the promiscuous user agent is locked to a gateway. Upon receiving an incoming call request from an external network or an outgoing call request from the internal network, the promiscuous user agent can then lock on the concerned gateway. Like the quantum user agent, once active in a call, the locked promiscuous user agent can publish the call states just like any other SIP devices.

Similarly, the locked promiscuous user agent can act on the SIP primitives that the communication applications use to control the behavior of the promiscuous user agent.

The phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

BRIEF DESCRIPTION OF THE DRAWINGS

The present disclosure is described in conjunction with the appended figures.

Figure 1:
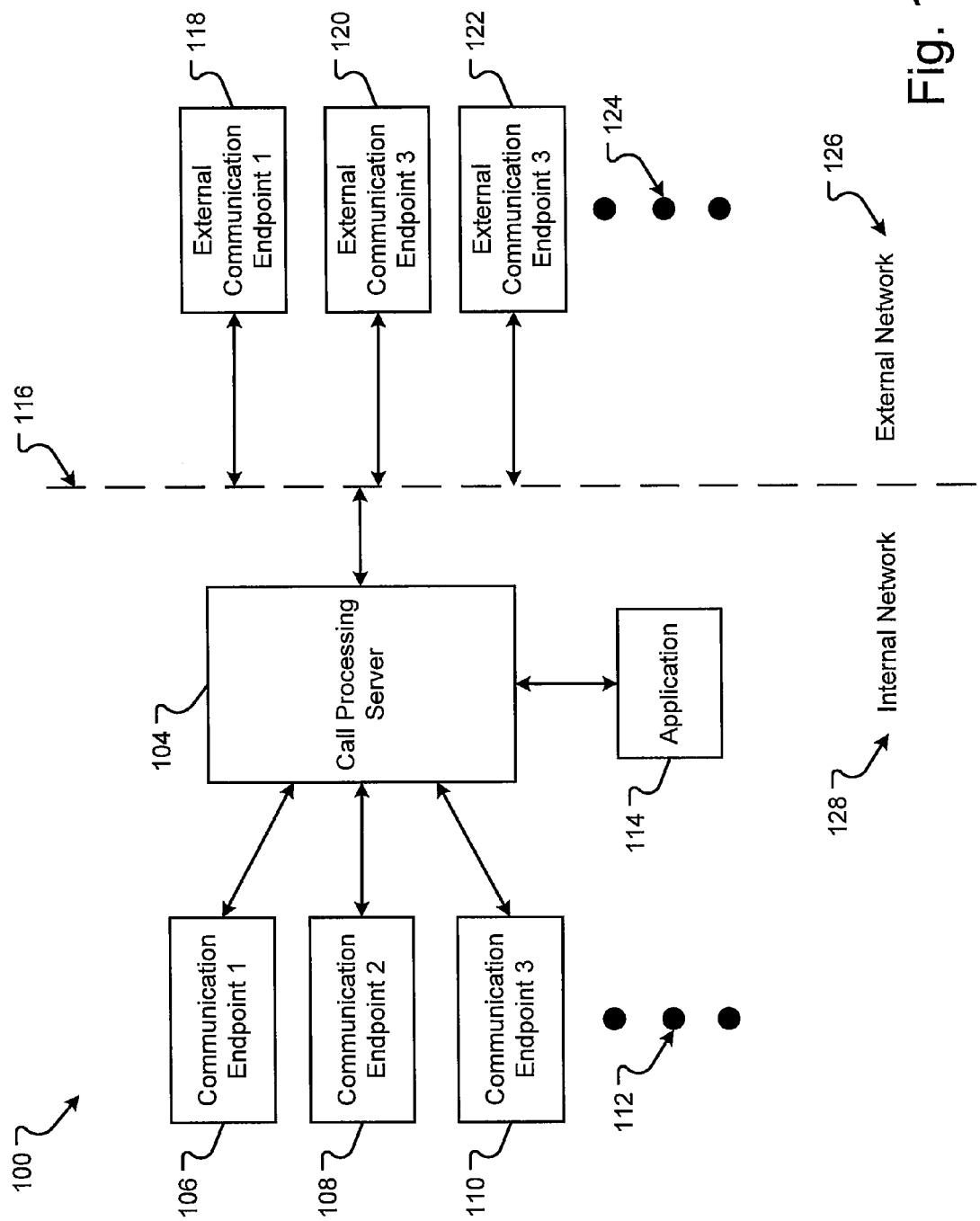
FIG. 1 is a block diagram of an embodiment of a call processing system that can provide SIP features to an external caller.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the invention. Rather, the ensuing description will provide those skilled in the art with an enabling description for implementing the embodiments. It will be understood that various changes may be made in the function and arrangement of elements without departing from the spirit and scope of the invention as set forth in the appended claims.

The embodiments presented herein provide systems and methods for providing a user agent for external communications to a communications system using SIP. An embodiment of a communication system 100 is shown FIG. 1. The communications system 100 includes an internal network 128 and an external network 126 delineated by demarcation line 116. The internal network 128 can include hardware and/or software operable to receive or send communications. In embodiments, the internal network 128 represents an internet protocol (IP) private branch exchange (PBX) that employs SIP.

The internal network 128 can include a call processing server 104 and one or more communication endpoints 106, 108, and 110. The internal network 128 can include fewer or more endpoints than shown in FIG. 1, as represented by ellipses 112. A communication endpoint 106, 108, and 110 can be any source or destination for communication data. For example, the communication endpoint 106, 108, and 110 can be a telephone, a SIP-enabled telephone, a soft client executing on a computer system, an application executing on a computer system, etc. The call processing server 104 is a server or computer system as described in conjunction with FIGS. 7 and 8. The call processing server 104 is operable to manage, receive, send, transfer, or organize communications between communication endpoints. In embodiments, the call processing server 104 can also provide information or data about communications and provide features or functions to communication endpoints 106, 108, and 110 and/or applications 114.

The internal network 128 may also include one or more applications, represented by application 114. An application 114 can be any software application that executes on a computer system and may interact with the call processing server 104. The application 114 may receive data about one or more communications managed by the call processing server 104. With SIP, the call processing server 104 allows applications 114 to interact with the communications system 100.

The communication system 100 also includes an external network 126 that can include one or more external communication endpoints 118, 120, and/or 122. The external network 126 can include fewer or more endpoints than shown in FIG. 1, as represented by ellipses 124. An external communication endpoint 118, 120, or 122 can be any source or destination for communication data communicated to or from the internal network 128. For example, the communication endpoint 106, 108, and 110 can be a telephone communicating through a public switched telephone network (PSTN) or other phone network, a mobile telephone, an internet phone, etc.

Figure 2:
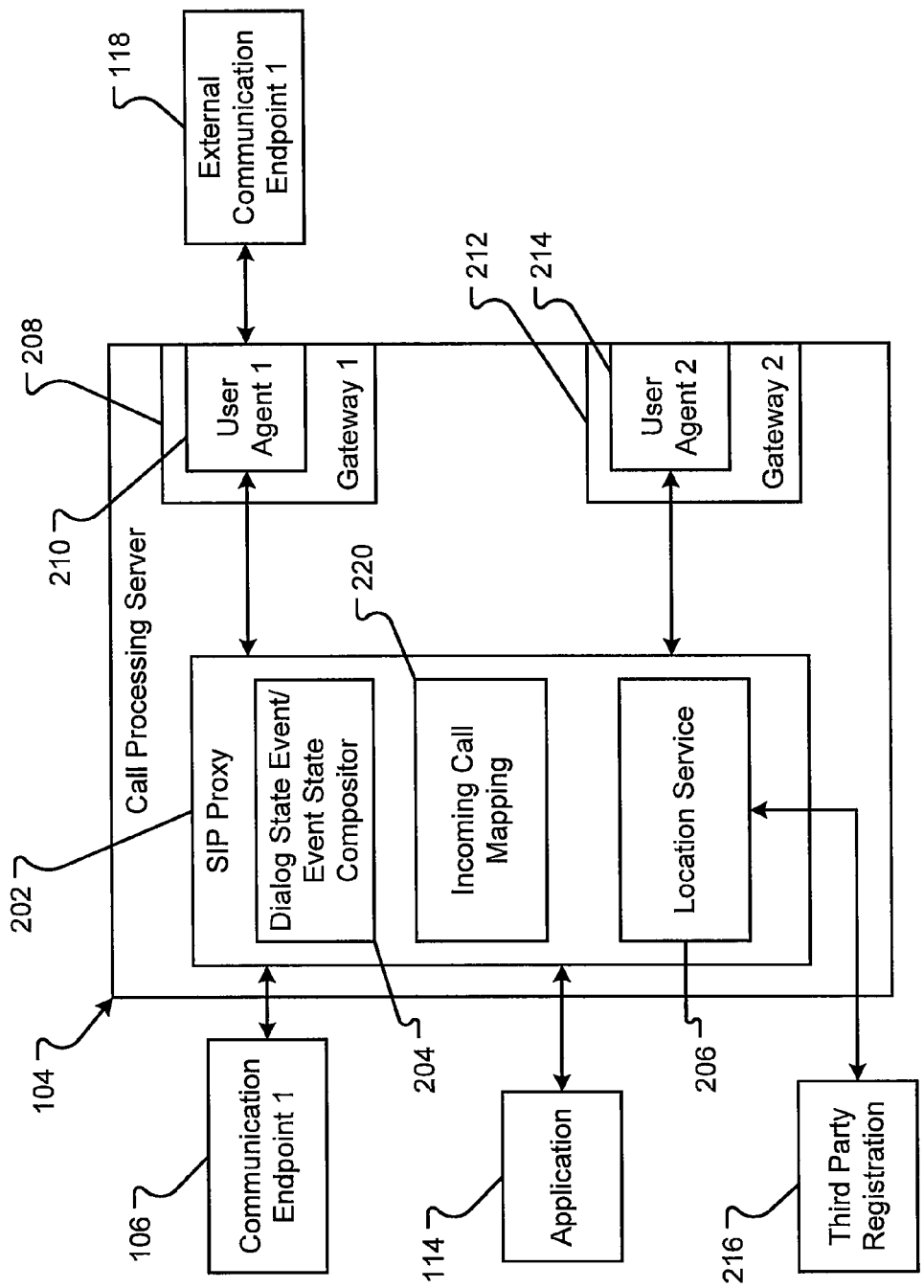
FIG. 2 is a block diagram of an embodiment of a call processing server that can provide SIP features to an external caller.

An embodiment of a call processing server 104 operable to conduct communications in the communication system 100 (FIG. 1) is shown in FIG. 2. The call processing server 104 can comprise one or more components, which may execute as computer modules. The call processing server 104 can include one or more of, but is not limited to, a SIP proxy 102 and one or more user agents 208 and/or 212.

In embodiments, the SIP Proxy 202 is an application operating in the IP PBX internal network 128 (FIG. 1). The SIP Proxy 202 handles the setup of SIP calls in the internal network 128. The SIP Proxy 202 includes various functions, such as routing requests to a user's location, authenticating and authorizing users for services, implementing provider call-routing policies, and providing features to users.

The SIP Proxy 202 can include a location service 206. The location service 206 may be a sub-process that determines or associates a user with one or more user devices. In embodiments, the location service 206 is extended to associate enterprise users to one or more external user devices, e.g., a mobile phone. The one or more external devices can be represented by a contact address, for example, a phone number or other communication address. An application 114 can send a communication request to the SIP Proxy 202. The communication request can include an identifier (e.g., user@company.com) for the user, which may be referred to as an address-of-record (AOR). The SIP Proxy 202 can send the identifier to the location service 206 to obtain a list of the user's communication devices. The location service 206 can then determine that the user, with the identifier, has an associated mobile phone number (e.g., 303.555.1212). Then, using the returned mobile phone number, the SIP proxy 202 can begin to establish a communication with the mobile phone by routing the call to the appropriate gateway 208 or 212.

The SIP Proxy 202 may also include a dialog state event/event state compositor (DSE/ESC) 204. The DSE/ESC 204 can collect event status from one or more communications being conducted on the internal network 128 (FIG. 1). An event state can be any state information for a resource (e.g., a communication endpoint 106 (FIG. 1), associated with an address-of-record. The DSE/ESC 204 can also publish the event state of one or more resources and/or addresses-of-record. To receive the event state, an application 114 can register with the DSE/ESC 204 to receive the event state for one or more resources and/or address-of-record. The event state and event state publishing are further described in the Request for Comment (RFC) 3903 published by the Network Working Group of the Internet Engineering Task Force (IETF) in October 2004, which is incorporated by reference herein in the publication's entirety for all the publication teaches.

The call processing server 104 can also include an incoming call mapping service 220. In embodiments, the incoming call mapping service 220 can be a function of the SIP Proxy 202 or a separate process executing outside the SIP Proxy 202. For incoming calls from a mobile phone or external device 118, the incoming call mapping service 220 of the SIP Proxy 202 can access a separate store of information to find an identity for a user associated with the mobile phone number or address for the external communication endpoint 118. In an alternative embodiment, the incoming call mapping service 220 can access the information in the location service 206 to determine a user identity associated with the mobile phone number or address of the external communication endpoint 118. If found, the SIP Proxy 202 can retrieve the identifier (e.g., the AOR) for a user associated with the phone number. This process is in contrast to the location service 206 that can determine a phone number for the external communication endpoint 118 associated with a provided identifier. The incoming call mapping service 220 and mapping of incoming calls are described in U.S. application Ser. No. 12/701,165, entitled "NON-ENTERPRISE IDENTITIES TABLE," which is incorporated by reference in its entirety for all it teaches.

In embodiments, the call processing server 104 includes one or more gateways 208 and/or 212. A gateway 208 and/or 212 can be a network access point that acts as a connection to another network. A gateway 208 and/or 212 may include a router to direct a given packet of data and a switch to furnish the path in and out of the gateway for a data packet. Each gateway 208 or 212 can be associated with a different external network 126. For example, gateway 208 may be associated with a PSTN network. Likewise, gateway 212 can be associated with the Internet.

In embodiments, a user agent 210 and/or 214 is a process that is instantiated and/or locked onto a gateway 208 or 212 when a communication is conducted between the call processing server 104 and an external communication endpoint 118. Thus, for every communication, a different instance of a user agent 210 and/or 214 is instantiated and/or locked. With the external communication endpoint 118 outside the internal network 126, the external communication endpoint 118 is not provided a similar interface that is normally associated with the SIP-enabled communication endpoints in the internal network 128. However, the user agent 210 and/or 214 can help provide at least a similar interface for the external communication endpoint 118. Thus, the user agent 210 and/or 214 acts as a surrogate for the external communication endpoint 118 and provides SIP-enabled functionality and interface for the external communication endpoint 118.

The user agents 210 and/or 214 can be of two types: a quantum agent or a promiscuous agent. A quantum agent is a user agent that is associated with a user identity. In other words, if a call is made to an external communication endpoint that is associated with a registered user of the enterprise, the user agent 210 and/or 214 will be a quantum agent. For example, if James Moore is an internal user and has a user identity, such as an AOR (e.g., james.moore@company.com), and James' mobile phone number is registered as associated with the AOR, a call to or from James' mobile phone can be identified as associated with James' user identity. With the user identity associated with the phone call, a quantum user agent can report status of communications associated with James' user identity with the DSE/ESC 204. Further, the behavior of the quantum user agent can be controlled prior to the call. For example, the SIP proxy 202 can instruct a quantum user agent to initiate a new call before an instance of the quantum user agent is locked onto a gateway for the call. The quantum user agent can be identified by a user identity and a contact address. In other words, a communication can be directed to a quantum user agent by send a command to the quantum user agent using the identifying information. In embodiments, the quantum user agent registers with the enterprise SIP proxy 202 using an AOR that represents an enterprise user and/or a contact address that represents one of the external phones of the enterprise user. Thus, an application or caller can provide the SIP proxy 202 with the contact address (e.g., the phone number for an external phone) of a quantum user agent to initiate a call. Then, while the quantum user agent registers with the DSE/ESC 204, the quantum user agent can provides the external number as the contact address.

Employing the external phone number as the contact address allows the SIP proxy 202 to route pre-call requests from the communication applications to the gateway 208 or 212 best suited to handle the call. A quantum user agent does not have a fixed location and is not active until a call request is attempted. The DSE/ESC 204 of the SIP proxy 202 can publish the event status (e.g., the registration event package) of the quantum user agent to the interested communication applications. At some time after initiating the call, the quantum user agent can lock an instance of itself to a gateway 208 or 212. The quantum user agent may lock an instance to a particular gateway 208 or 212 upon one of: receiving a request from a communication application to initiate a call; receiving incoming a call request from the external network; or receiving an outgoing call request towards the external network. The quantum user agent may have multiple parallel instances on the multiple gateways. Once active in a call, the locked quantum user agent can report the call states to the DSE/ESC 204 just like any other SIP device. The locked quantum user agent can also act on SIP primitives provided by the SIP proxy 202, like the REFER method, that the communication applications use to control the behavior of a SIP device.

In contrast, a promiscuous agent is a user agent that is not associated with a user identity for an enterprise user. In other words, if a call is made to or received from an external communication endpoint that is not associated with a registered user within the enterprise, the user agent 210 and/or 214 will be a promiscuous agent. For example, if James Moore is an outside caller that has no user identity in the location service 206 of the enterprise, such as an AOR, a call to or from James' mobile phone cannot be associated with a user identity. As such, a general identity (e.g., outsider@example.com) is used to identify the caller. The general identity can then be used to instantiate the promiscuous agent and/or lock the promiscuous agent to a gateway 208 or 212.

The promiscuous user agent may not register with the SIP proxy 202. The promiscuous user agent can be completely dormant until a call request arrives, either from the internal network or from one of the external networks, at one of the gateways 208 or 212. The communication application may not control the promiscuous user agent until an instance of the promiscuous user agent is locked to a gateway 208 or 212 because there is no AOR or identity to which to direct a command. Upon receiving an incoming call request from an external network or an outgoing call request from the internal network, the promiscuous user agent can lock an instance of itself to the gateway 208 or 212. Like the quantum user agent, once active in a call, the locked promiscuous user agent can report the call states to the DSE/ESC 204 of the SIP proxy 202, just like any other SIP devices. Similarly, the locked promiscuous user agent can act on the SIP primitives that communication applications use to control the behavior of SIP devices.

Figure 3:
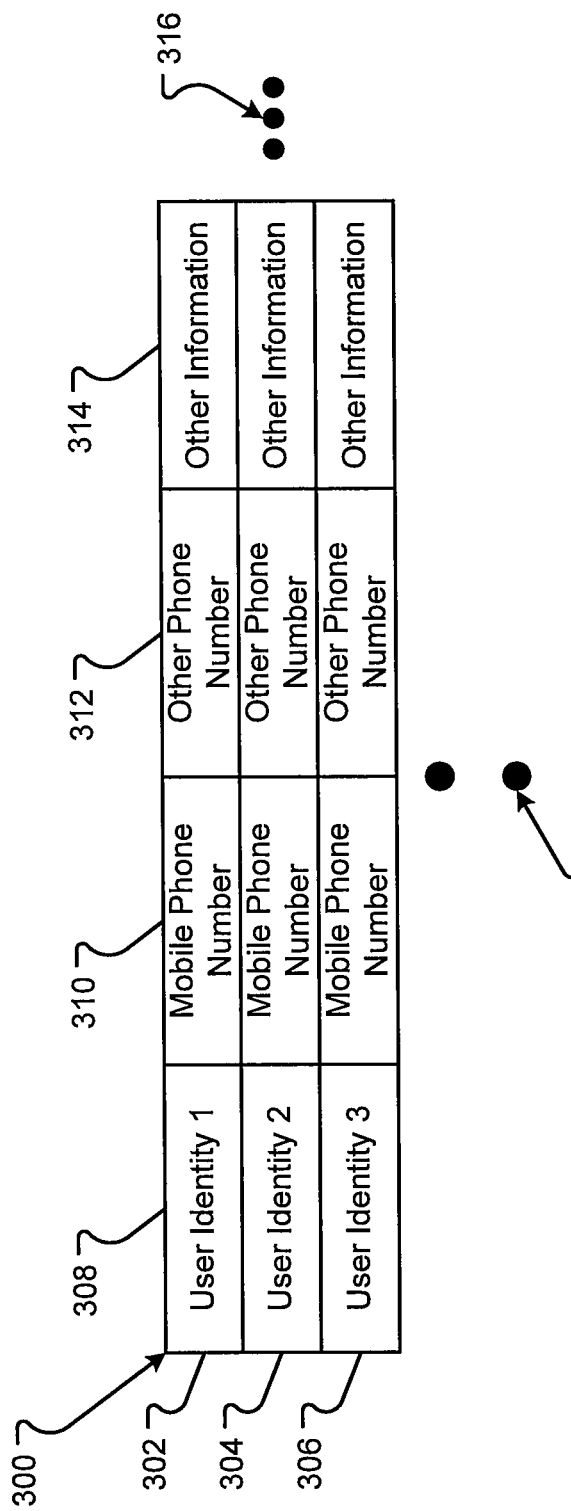
FIG. 3 is a block diagram of an embodiment of a phone number registered with an identity in a location service.

An embodiment of a data structure representing a data structure 300 that can represent the location service 206 information or information accessed by the incoming call mapping service 220 is shown in FIG. 3. While a format for the data structure 300 is shown in FIG. 3, it should be noted that other formats are possible using the same information. A data structure 300 can comprise one or more rows or entries for user records 302, 304, and/or 306. In embodiments, a user can register with the location service 206 (FIG. 2) or a third party registration service 216 to associate the user's identity (e.g., address-of-record) with one or more contact addresses, which may be phone numbers for external communication endpoints 118 (FIG. 1) or other phone numbers or addresses for other communication devices. For example, a user with an AOR of user@company.com can register to associate a mobile phone number of 303.555.1212 with the AOR. A third party registration service 216 can send a mapping, of the user identity to a contact address, to the location service 206. The location service 206 (FIG. 2) can store the user record 302, 304, and/or 306 in the data structure 300 that includes the received mapping. The data structure 300 can include fewer or more user records or contact addresses than shown in FIG. 3, as represented by the ellipses 318.

A user record 302, 304, and/or 306 can include one or more data fields. The user records 302, 304, and/or 306 can include fewer or more data fields than shown in FIG. 3, as represented by ellipses 316. In embodiments, the user record 302, 304, and/or 306 includes a user identity data field 308 that stores a user identity. A user identity 308 can be an AOR, such as user1@company.com, an IP address, or some other identifier that may be used in a SIP-enabled communication network. The data structure 300 may then include one or more contact addresses, e.g., phone numbers or other "addresses," which are associated with the user identity 308. For example, the mobile phone number data field 310 can store the mobile phone number for the user's mobile phone. The other phone number data field 312 can store a home phone number, a second mobile phone number, or other phone number. Finally, the other information data field 314 can store another address, such as an IP address for a user computer system or soft client executing on a computer system on an external network 246.

Figure 4:
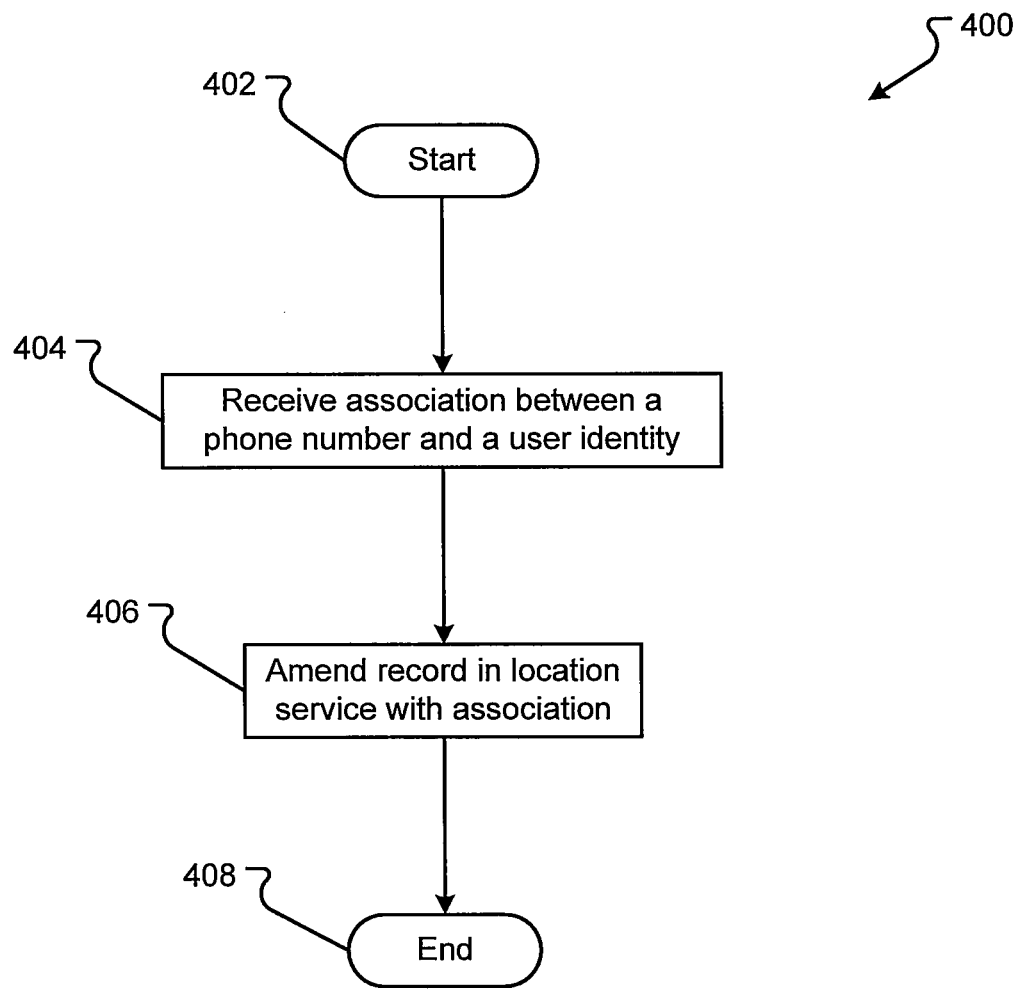
FIG. 4 is a flow diagram of an embodiment of a process for registering an external communication endpoint with a user identity.

An embodiment of a method 400 for registering an external phone number, address, or other information with the call processing server 104 is shown in FIG. 4. Generally, the method 400 begins with a start operation 402 and terminates with an end operation 408. While a general order for the steps of the method 400 are shown in FIG. 4, the method 400 can include more or fewer steps or arrange the order of the steps differently than those shown in FIG. 4. The method 400 can be executed as a set of computer-executable instructions executed by a computer system and encoded or stored on a computer readable medium. Hereinafter, the method 400 shall be explained with reference to the systems, components, modules, software, data structures, etc. described in conjunction with FIGS. 1-3.

The SIP Proxy 202 or a third party registration service 216 receives an association between the user's identity and a phone number, address, or other information for a user's external communication endpoint 118, in step 404. In embodiments, the location service 206 receives the association. The association can be an input or signal from a third party registration service 216 to the location service 206. The location service 206 amends the data structure 300 to include the new association, in step 406. In embodiments, the location service 206 searches the data structure 300 for the user identity provided in the association. For example, the location service 206 searches for an AOR in the user identity fields 308 of the various user records 302, 304, or 306. If the user identity is not found in any user record 302, 304, or 306, the location service 206 creates a new user record. The user identity is stored in the user identity field 308 and the one or more phone numbers or other addresses are stored in one or more of the other fields 310, 312, and/or 314. If the user identity is found in one or more of the user records 302, 304, or 306, the user record 302, 304, or 306 is amended to change or add the one or more phone numbers or other address in one or more of the other fields 310, 312, and/or 314.

Figure 5:
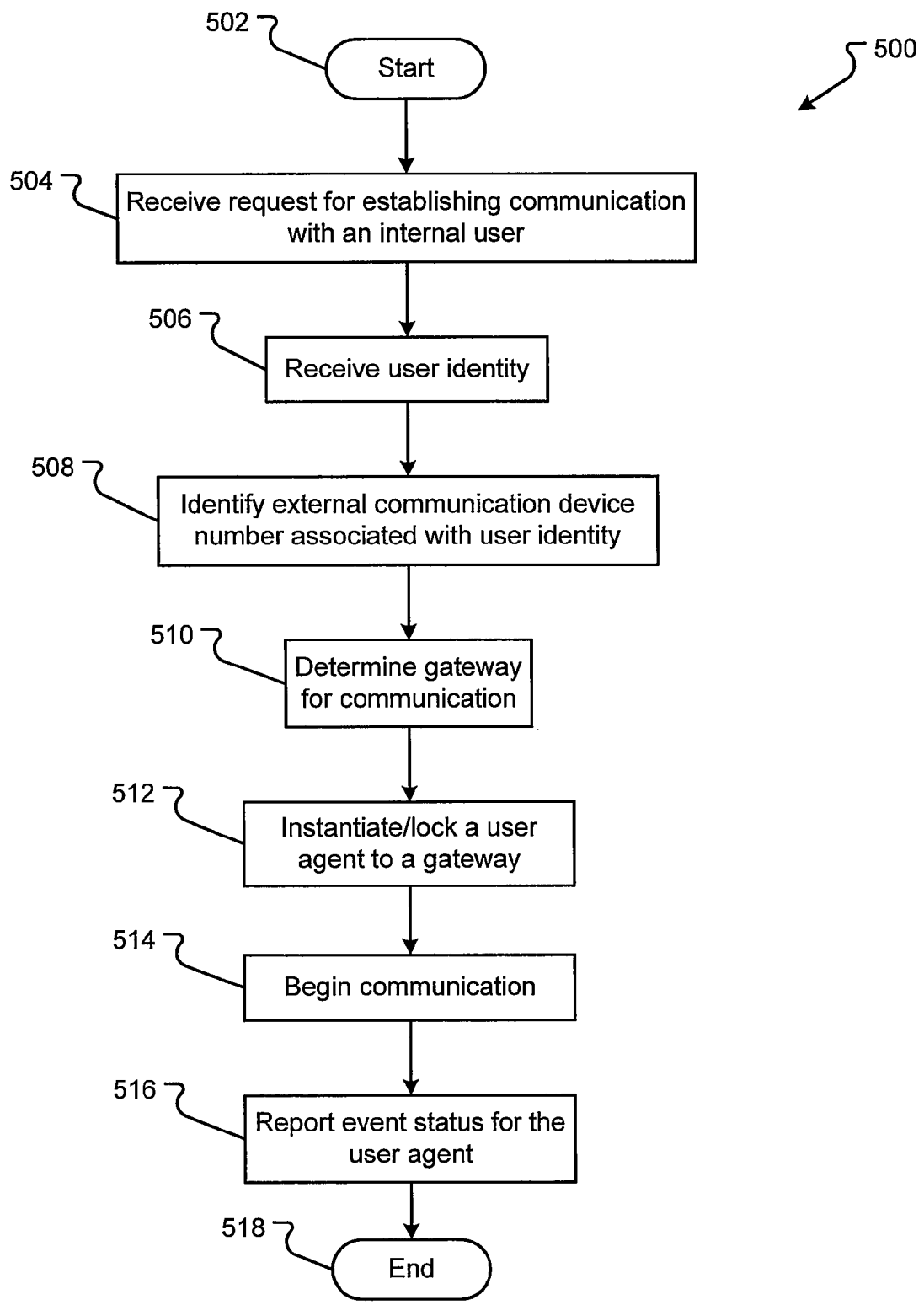
FIG. 5 is a flow diagram of an embodiment of a process for processing a phone call initiated from an internal communication endpoint to an external communication endpoint.

An embodiment of a method 500 for establishing a communication, originated by an internal communication endpoint 106 or application 114 and to an external communication endpoint 118 is shown in FIG. 5. Generally, the method 500 begins with a start operation 502 and terminates with an end operation 518. While a general order for the steps of the method 500 are shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, software, data structures, etc. described in conjunction with FIGS. 1-3.

The call processing server 104 receives a request to initiate or establish a communication with an internal user in step 504. As an example, the external communication endpoint 118 is a mobile telephone. The request may have been initiated by an internal communication endpoint 106 or an application 114. If the request was initiated by an application 114, the communication may be between the mobile phone 118 and the SIP-enabled phone 106 of another user. In embodiments, the SIP Proxy 202 of the call processing server 104 receives a user identity, in step 506. The user identity is part of the initial request. The user identity can be an AOR, such as user1@company.com. The request may be sent to a quantum user agent. For example, the communication request can be of the form: "REFER identity=user1@company.com." With the user identity, the SIP Proxy 202 employs the location service 206 to determine one or more phone numbers, which may be to one or more external devices, associated with the user identity, in step 508. The location service 206 can look up and retrieve the one or more associated phone numbers 310, 312, or 314.

The SIP proxy 202 may then determine to which gateway 208 to pass the phone number 310, in step 510. The gateway 208 communicates with an external network 126 that is associated with the at least one of the desired phones 118. The call processing server 104 can then lock an instance of a user agent 210 on the gateway 208, in step 512. In embodiments, the user agent 210 is a quantum agent because the user agent 210 is associated with a registered user. The communication may then proceed through known processes of ringing the mobile phone, connecting the mobile phone with the other user's phone 106, and allowing the communication, in step 514. After or while the communication is being established, the user agent 210 can report event status to the DSE/ESC 204 in step 516. Thus, the user agent 210 provides the user identity 308 to the DSE/ESC 204. The DSE/ESC 204 may then report event status for the communication as the user agent 210 publishes the event status. The DSC/ESC 204 allows applications 114 or other communication endpoints to receive event status for the communication although the address for user agent 210 was not known until the user agent 210 was locked onto the gateway 208. Further, the applications can send SIP primitives to the user agent 210 by using the reported contact address provided by the DSC/ESC 204. For example, an application 114 can send the SIP primitive to transfer the call to the user agent having a contact address for the external device and locked on the gateway 208. As such, features and other functions provided in a SIP environment can be provided to the phone communication through the user agent 210.

Figure 6:
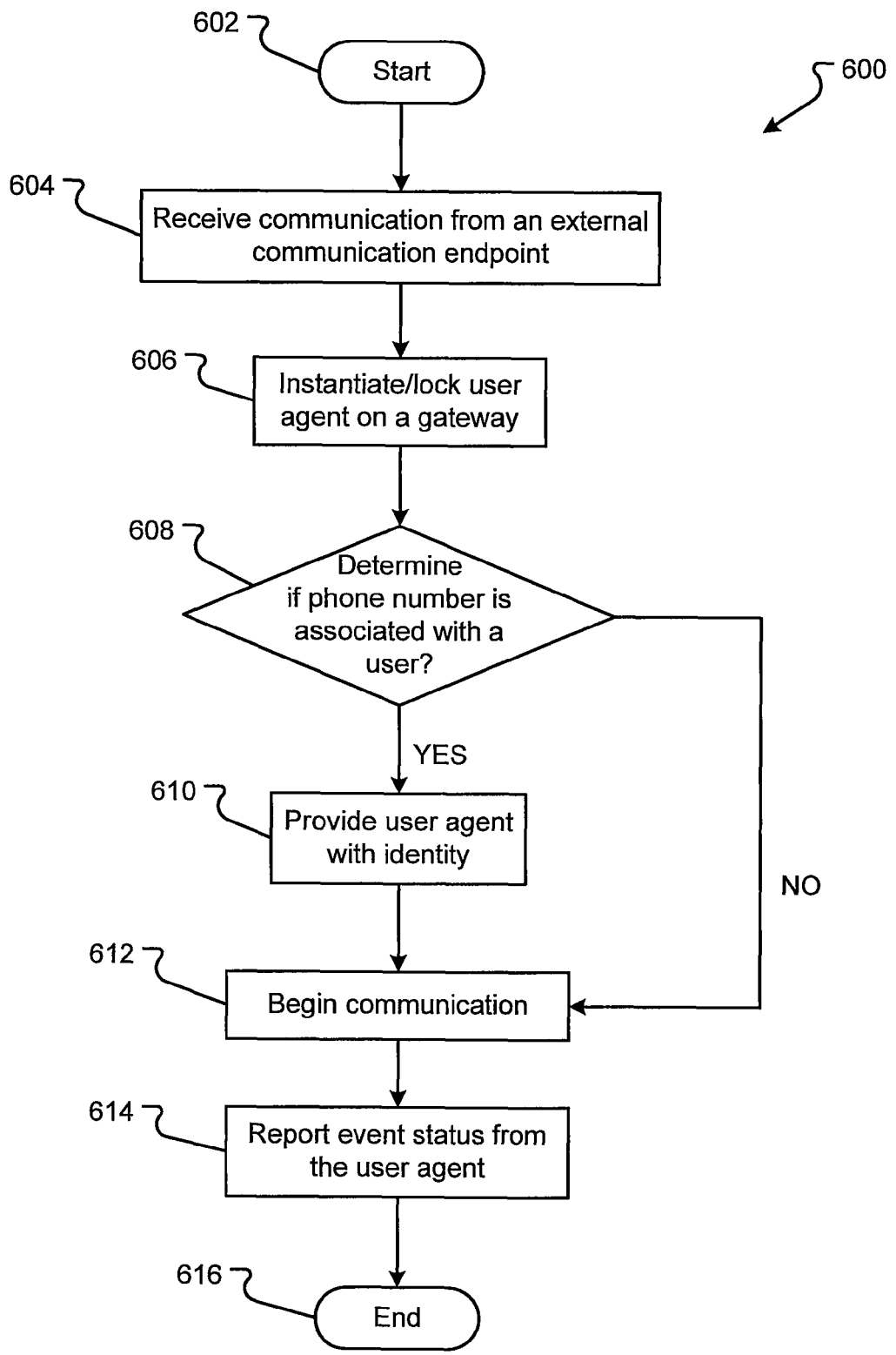
FIG. 6 is a flow diagram of an embodiment of a process for processing a phone call initiated from an external communication endpoint to an internal communication endpoint

An embodiment of a method 600 for establishing a communication, originated by an external communication endpoint 118, to an internal communication endpoint 106 is shown in FIG. 6. Generally, the method 600 begins with a start operation 602 and terminates with an end operation 616. While a general order for the steps of the method 600 are shown in FIG. 6, the method 600 can include more or fewer steps or arrange the order of the steps differently than those shown in FIG. 6. The method 600 can be executed as a set of computer-executable instructions executed by a computer system and encoded or stored on a computer readable medium. Hereinafter, the method 600 shall be explained with reference to the systems, components, modules, software, data structures, etc. described in conjunction with FIGS. 1-3.

A gateway 208 receives a request, from an external communication endpoint 118, to initiate or establish a communication to an internal communication endpoint 106, in step 604. As an example, the external communication endpoint 118 is a mobile telephone. The request may have been initiated by the phone 118 calling a user in the internal network 128. The call processing server 104 then may instantiate and may lock an instance of a user agent 210 on the gateway 208, in step 606. In embodiments, the user agent 210 is a promiscuous agent because the user agent 210 is not yet associated with a registered user.

In embodiments, the incoming call mapping service 220 of the SIP proxy 202 determines if the received phone number is associated with a registered user, in step 608. The incoming call mapping service 220 can search one or more user records 302, 304, or 306 for the phone number in 308, 310, and/or 312. If the incoming call mapping service 220 finds the phone number in 310, 312, and/or 314 in a user record 302, 304, or 306, the method 600 flows YES to step 610 where the incoming call mapping service 220 can provide the user identity 308 associated with the phone number to the user agent 210, in step 610. If the user agent 210 is provided with a user identity, the user agent 210 is a quantum agent because the user agent 210 is associated with a particular user. If the incoming call mapping service 220 does not find the phone number in 310, 312, and/or 314 in a user record 302, 304, or 306, the method 600 flows NO to step 612.

The incoming call mapping service 220 may then pass the identity for the called party to the SIP Proxy 202. The incoming call mapping service 220 can determine the identity of the party with the phone number being called. The communication may then proceed through known processes of ringing the mobile phone and the other user's phone 106, connecting the phones, and allowing the communication, in step 612.

After or while the communication is being established, the user agent 210 can report event status to the DSE/ESC 204, in step 614. Thus, the user agent 210 provides the user identity 308 for the phone user to the DSE/ESC 204 if the user agent 210 is a quantum agent. In contrast, if the user agent 210 is a promiscuous agent, the user agent 210 provides a general identity (e.g., outsidecaller@example.com) to the DSE/ESC 204.

The DSE/ESC 204 may then report the event status associated with the AOR to one or more applications 114. It should be noted that an application that subscribes to the DSC/ESC 204 to receive event status associated with the general identity may receive several event status for several promiscuous agents. However, the several event status signals may be by the contact address (e.g., the mobile phone number) associated with the promiscuous user agents. Again, the DSC/ESC 204 allows applications 114 or other communication endpoints to receive event status for the inbound communication although the address for user agent 210 was not known until the user agent 210 was locked onto the gateway 208. Further, the applications 114 can send SIP primitives to the user agent 210 by using the reported contact address provided by the DSC/ESC 204. For example, an application 114 can send the SIP primitive, to transfer the call, to the user agent having a contact address for the external device and locked on the gateway 208. As such, features and other functions provided in a SIP environment can be provided to the phone communication through the user agent 210.

Figure 9:
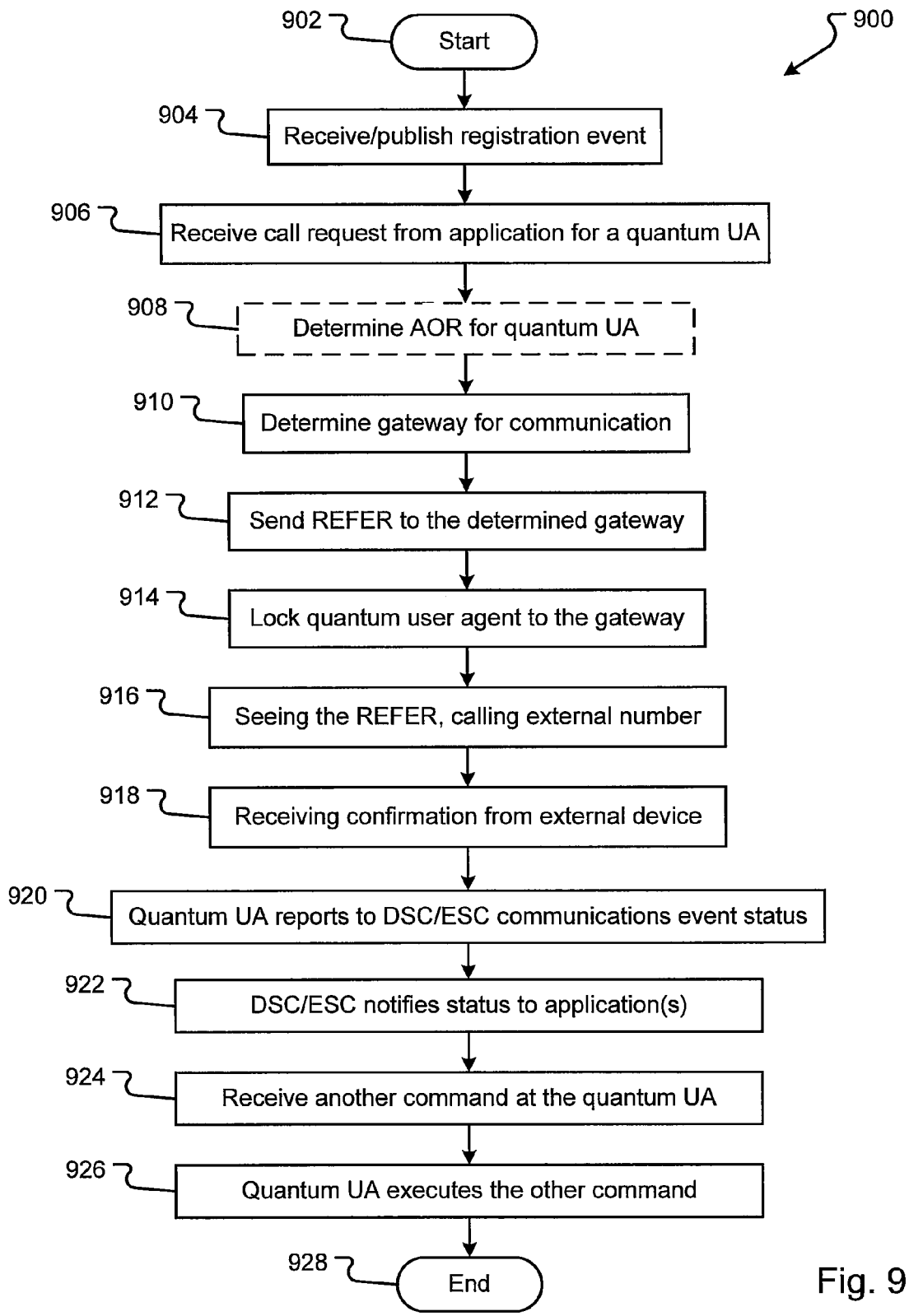
FIG. 9 is a flow diagram of an embodiment of a process for using a quantum user agent with a call.

An embodiment of a method 900 for establishing a communication using a quantum user agent and originated by an application 114, to an external communication endpoint 118 is shown in FIG. 9. Generally, the method 900 begins with a start operation 902 and terminates with an end operation 928. While a general order for the steps of the method 900 are shown in FIG. 9, the method 900 can include more or fewer steps or arrange the order of the steps differently than those shown in FIG. 9. The method 900 can be executed as a set of computer-executable instructions executed by a computer system and encoded or stored on a computer readable medium. Hereinafter, the method 900 shall be explained with reference to the systems, components, modules, software, data structures, etc. described in conjunction with FIGS. 1-3.

The location service 206 receives a registration request in step 904. The registration request can be an amendment to an enterprise user's record that associates the user's AOR with a mobile phone number. A third party registration service 216 records the registration and sends the registration to the SIP Proxy 202 for the location service 206. This registration event can be reported to an application 114, other applications monitoring registration events, or communication endpoints 106.

Later, the application 114 can send a communication request to a contact address for a user agent, in step 906. For example, the communication request from the application 114 can appear as "REFER:mobile#@proxy;user=user1@example.com;Refer-to:user2@example.com." The information in the communication request also directs the communication request to the SIP Proxy 202. The communication request can be a REFER command directed to a quantum user agent. As explained in conjunction with FIG. 2, the quantum user agent offers the capability that the external components can control the behavior of the quantum user agent prior to the call. The REFER command, first routes through the proxy (mobile@PROXY), which selects a gateway to route the mobile number through, in step 910, and routes the REFER message to the gateway. The gateway, upon receiving the REFER command, can create a quantum user agent for user 2, pass the REFER to the quantum user agent, which instructs the quantum user agent to initiate a new call. Initially, the quantum user agent is registered (by a third party) with the SIP proxy 202 using the external phone number, provided by the application 114. this external number forms the user portion of the contact address (e.g., sip:EXTERNALMOBILENUMBER@proxy;user=user1AOR. Thus, while registering, the SIP Proxy 202, other applications, and/or the quantum user agent can use the external number as the contact address.

The location service receives the $3^{rd}$ party registration of the quantum user agent, which registers a mobile number to the user's AOR (e.g., sip: EXTERNALMOBILENUMBER@proxy;user= alice@example.com is registered to alice@example.com). The location service notifies interested applications of this registration through registration events. The registration event contains the same contact to AOR mapping. In this way, an application can make a call by sending a REFER to the contact address (i.e., the mobile number) learned in the registration event.

Further, the SIP Proxy 202 can determine the appropriate gateway 208 or 212 for the call. One of the gateways 208 or 212 may be more suitable for the call. For example, the call may be required to be sent on the Internet or a mobile phone network. Further, the SIP Proxy 202 can evaluate other factors, such as network load, time of day, recipient, etc. The SIP Proxy 202 can read the external phone number used initially as the AOR to help determine the best gateway 208 or 212. Thus, employing the external phone number as the contact address ensures that pre-call requests sent to the quantum user agent from the application 114 can be routed to the appropriate gateway 208 or 212. Further, the quantum user agent does not have a fixed location and is not active until a call request is attempted. Thus, user agents can float to different gateways 208 or 212.

The SIP Proxy 202 then sends the REFER command to the determined gateway through instructions to the quantum user agent in step 912. The command may appear as "REFER: mobile#@gateway;user=user1@example.com;Refer-to: user2@example.com." Upon referring the call to the appropriate gateway 212, the instance of the quantum user agent 214 may lock onto the gateway 212, in step 914. It should be noted that beyond receiving a request from the application 114 to initiate a call, the quantum user agent 214 can lock to a gateway in response to receiving an incoming call request from the external network 126 to an enterprise user or to receiving an outgoing call request from a communication endpoint 1 of an enterprise user and directed to the external network 126. Only a single instance of the quantum user agent 214 is hereinafter described. However, the quantum user agent may have multiple parallel instances executing on the multiple gateways 208 or 212.

the actual AOR of the user is found in the contact which the quantum user agent can retrieve from the REFER. The gateway 212 and the quantum user agent 214 then act on the REFER primitive by executing the refer command and sending the call to the external communication endpoint 118, in step 916. The quantum user agent 214 later receives a confirmation of the call from the external communication endpoint 118 in step 918. The confirmation can be a received dual multi-frequency (DMTF) signal. The gateway 212 can also invite another party (e.g., user2@example.com) into the call by sending a ringing response to a SIP phone 106, in step 919. Then, the quantum user agent 214 attaches the two parties to the communication.

The quantum user agent 214 also begins to publish event status to the DSC/ESC 204 of the SIP Proxy 202, in step 920. Thus, once active in a call, the locked quantum user agent 214 can publish the call states to the SIP Proxy 202 for the user's AOR, just like any other SIP device. The DSC/ESC 204 of the SIP Proxy 202 may then report these event states, in step 922, to applications 114 or devices 106 that subscribe to receive event status from the user's AOR. Thus, user agents can be part of the registration event package provided by the SIP proxy 202.

At some time thereafter, the quantum user agent 214 can receive another SIP primitive, in step 924. The SIP primitive can be another OOD REFER method, a hold command, a transfer command, a drop command, a conference command, or other commands. These SIP primitives control the behavior of the quantum user agent 214. Thus, the quantum user agent 214 executes the command in step 926 to change the management of the call. For example, the SIP primitive can be to transfer the call from SIP phone 106 to SIP phone 108. The quantum user agent 214 can send the call to the new SIP phone 108. During transfer, the quantum user agent 214 may put the call on hold and then disconnect SIP phone 106 after the transfer is complete. Any SIP primitive can be executed by the quantum user agent 214 similar to any other SIP-enabled communication endpoint 106, but the quantum user agent 214 executes the SIP primitives for the external communication endpoint 118. Thus, as seen in this embodiment, user agents can support OOD REFER, allow routing selection, and publish dialog state event normally only supported by the internal communication SIP devices.

Figure 10:
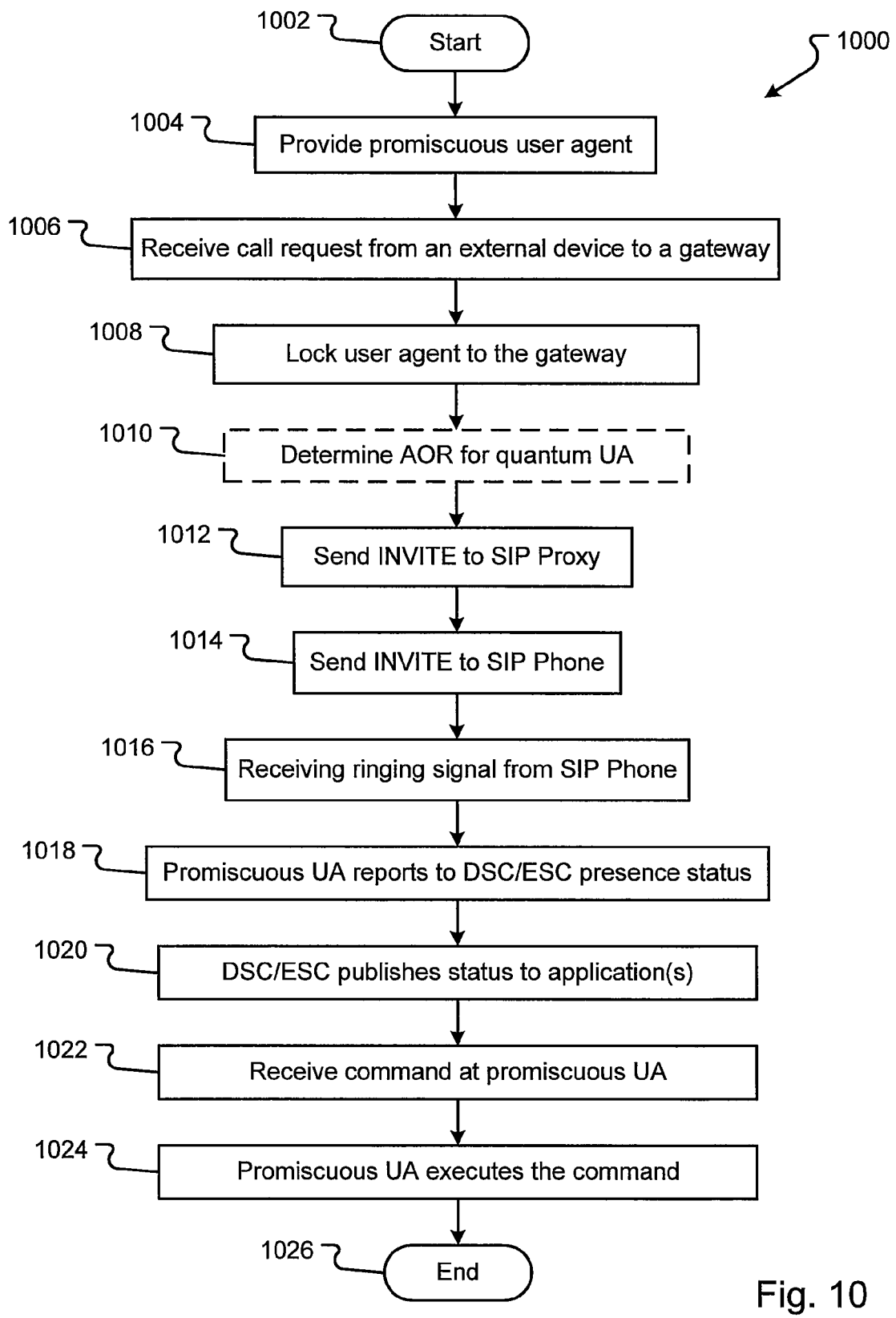
FIG. 10 is a flow diagram of an embodiment of a process for using a promiscuous user agent with a call.

An embodiment of a method 1000 for establishing a communication using a promiscuous user agent and originated by an external communication endpoint 118, to an SIP phone 106, is shown in FIG. 10. Generally, the method 1000 begins with a start operation 1002 and terminates with an end operation 1026. While a general order for the steps of the method 1000 are shown in FIG. 10, the method 1000 can include more or fewer steps or arrange the order of the steps differently than those shown in FIG. 10. The method 1000 can be executed as a set of computer-executable instructions executed by a computer system and encoded or stored on a computer readable medium. Hereinafter, the method 1000 shall be explained with reference to the systems, components, modules, software, data structures, etc. described in conjunction with FIGS. 1-3.

A promiscuous user agent 210, which was dormant on the gateway 208, is provided, in step 1004. A gateway 208 can receive a phone call from an external communication endpoint 118, which may be a mobile phone, in step 1004. The call may be to a phone number of a communication endpoint 106, which can be a SIP-enable phone. At least initially, the caller is identified by the phone number for the external communication endpoint 118. The dormant promiscuous user agent 210 receives the call, in step 1006, and uses the mobile phone number for the external communication endpoint 118 as the initial contact address for the promiscuous user agent 210. Further, the promiscuous user agent 210 uses a general identifier for the AOR, for example, "outsidecaller@example.com."

Upon receiving the call, the instance of the promiscuous user agent 210 is locked to the gateway 208 that received the call, in step 1008. Unlike quantum user agent, the promiscuous user agent 210 may not register with the SIP proxy 202 initially. The promiscuous user agent 210 can be completely dormant until a call request arrives (incoming as well as outgoing) at one of the gateways 208 or 212. Thus, the promiscuous user agent 210 may not allow an application 114 to control the behavior of the promiscuous user agent 210 until the instance of the promiscuous user agent 210 is locked to the gateway 208. Upon receiving the incoming call request from the external network 126, the promiscuous user agent 210 can then lock its instance to the gateway 208.

The incoming call mapping service 220 may then determine the actual AOR for the external communication endpoint 118, in step 1010. The incoming call mapping service 220 may attempt to find the phone number for the external communication endpoint 118 in the information stored with the location service 206 or in another store of information. If the phone number for the external communication endpoint 118 is found, the user's actual AOR (e.g., user1@example.com) would be retrieved and sent to the promiscuous user agent 210. The promiscuous user agent 210 would then become a quantum user agent with the user's identity as the AOR. However, in this embodiment, it is assumed that the phone number for the external communication endpoint 118 is not located. Rather, the promiscuous user agent 210 uses a general AOR (e.g., outsidecaller@example.com). The general AOR is then used by the promiscuous user agent 210 as the AOR for publishing event status and receiving commands. The particular promiscuous user agent 210 may also be identified by the contact address, which can be the mobile phone number for the external communication endpoint 118, even if using the general AOR. As such, commands may be directed to specific promiscuous user agents by sending the command to the general AOR and the specific contact address.

Like the quantum user agent, once active in a call, the locked promiscuous user agent 210 can publish the call states to the DSC/ESC 204 of the SIP Proxy 202, just like any other SIP devices. To publish the event states to the DSC/ESC 204, the promiscuous user agent 210 registers with the DSC/ESC 204 after the call is active and the promiscuous user agent 210 is locked on a gateway 210. Then, the promiscuous user agent 210 can send the INVITE primitive to the SIP Proxy 202, in step 1012. In other words, the promiscuous user agent 210 begins to act like any other SIP device in sending and receiving SIP primitives. The SIP Proxy 202 can then receive the INVITE primitive and then send the INVITE primitive to a SIP phone 106, in step 1014. The SIP phone 106 can respond with a ringing signal, which can be received by the promiscuous user agent 210 and the external communication endpoint 118, in step 1016. The user may later answer the phone call at the SIP phone 106 and the gateway 210 can connect the callers.

After registration and/or during the phone call and after locking onto the gateway 210, the promiscuous user agent 210 publishes event status to the DSC/ESC 204 of the SIP Proxy 202, in step 1018. The DSC/ESC 204 of the SIP Proxy 202 may then report these event states, in step 1020, to applications 114 or devices 108 that subscribe to receive event status from the general AOR (e.g., outsidecaller@example.com). At some time thereafter, the promiscuous user agent 210 can receive another SIP primitive directed to the contact address of the promiscuous user agent 210, in step 1022. Similar to the quantum user agent described in conjunction with FIG. 9, the locked promiscuous user agent 210 can act on the SIP primitives that the applications 114 use to control the behavior of the promiscuous user agent 210. The SIP primitive can be another OOD REFER method, a hold command, a transfer command, a drop command, a conference command, or other commands. These SIP primitives control the behavior of the promiscuous user agent 210. Thus, the promiscuous user agent 210 executes the other command in step 1024 to change the management of the call.

For example, the SIP primitive can command a transfer of the call from SIP phone 106 to SIP phone 108. The promiscuous user agent 210 can send the call to the new SIP phone 108. During transfer, the promiscuous user agent 210 may put the call on hold and then disconnect SIP phone 106 after the transfer is complete. Any SIP primitive can be executed by the promiscuous user agent 210 similar to any other SIP-enabled communication endpoint 106 but executes for the external communication endpoint 118.

Figure 7:
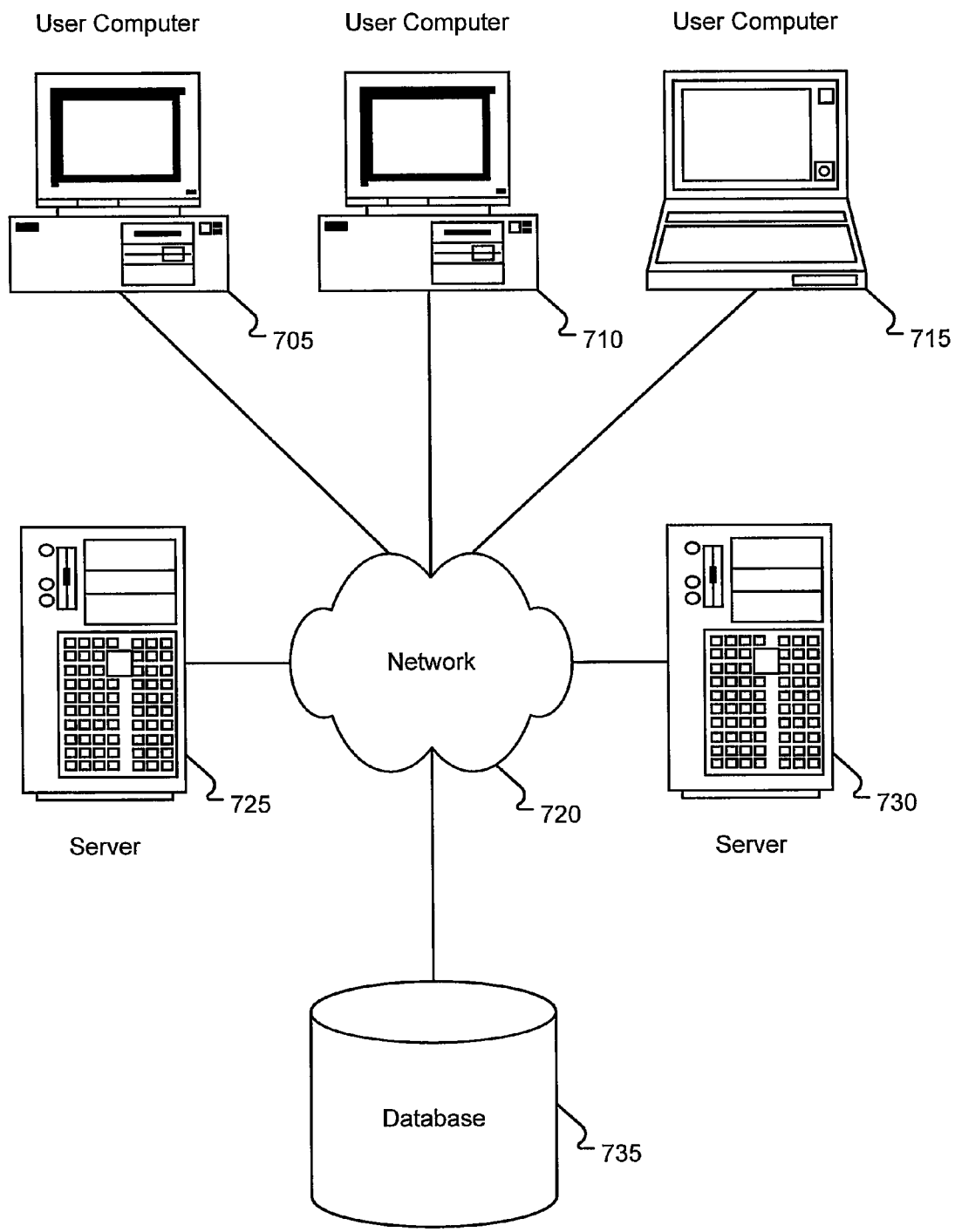
FIG. 7 is a block diagram of an embodiment of a computer system environment in which the systems and methods may be executed.

FIG. 7 illustrates a block diagram of a system 700 that may function as system 100 to provide SIP features to an external communication endpoint. The components of system 700 can also function as one or more components of system 100. The system 700 includes one or more user computers 705, 710, and 715. The user computers 705, 710, and 715 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 705, 710, 715 may also have any of a variety of applications, including for example, database client and/or server applications, and web browser applications. Alternatively, the user computers 705, 710, and 715 may be any other electronic device, such as a thin-client computer, Internet-enabled mobile telephone, and/or personal digital assistant, capable of communicating via a network (e.g., the network 720 described below) and/or displaying and navigating web pages or other types of electronic documents. Although the exemplary system 700 is shown with three user computers, any number of user computers may be supported.

System 700 further includes a network 720. The network 720 may can be any type of network familiar to those skilled in the art that can support data communications using any of a variety of commercially-available protocols, including without limitation SIP, TCP/IP, SNA, IPX, AppleTalk, and the like. Merely by way of example, the network 720 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 702.11 suite of protocols, the Bluetooth™ protocol known in the art, and/or any other wireless protocol); and/or any combination of these and/or other networks. The network 720 may be the same or similar to network 214.

The system may also include one or more server computers 725, 730. One server may be a web server 725, which may be used to process requests for web pages or other electronic documents from user computers 705, 710, and 720. The web server can be running an operating system including any of those discussed above, as well as any commercially-available server operating systems. The web server 725 can also run a variety of server applications, including SIP servers, HTTP servers, FTP servers, CGI servers, database servers, Java servers, and the like. In some instances, the web server 725 may publish operations available operations as one or more web services.

The system 700 may also include one or more file and or/application servers 730, which can, in addition to an operating system, include one or more applications accessible by a client running on one or more of the user computers 705, 710, 715. The server(s) 730 may be one or more general purpose computers capable of executing programs or scripts in response to the user computers 705, 710 and 715. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the web application server 730 may be forwarded to a user computer 705 via a web server 725. Similarly, the web server 725 may be able to receive web page requests, web services invocations, and/or input data from a user computer 705 and can forward the web page requests and/or input data to the web application server 730. In further embodiments, the server 730 may function as a file server. Although for ease of description, FIG. 7 illustrates a separate web server 725 and file/application server 730, those skilled in the art will recognize that the functions described with respect to servers 725, 730 may be performed by a single server and/or a plurality of specialized servers, depending on implementation-specific needs and parameters. The computer systems 705, 710, and 715, file server 725 and/or application server 730 may function as the call processing server 202 and, in some embodiments, the internal communication endpoints 106, 108, or 110, external communication endpoints 118, 120, or 122, the application 114, or other systems or components.

The system 700 may also include a database 735, which may be the same or similar to information accessed by the location service 206. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. In a particular set of embodiments, the database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. In one set of embodiments, the database 735 may be a relational database, such as Oracle 10i™, that is adapted to store, update, and retrieve data in response to SQL-formatted commands.

Figure 8:
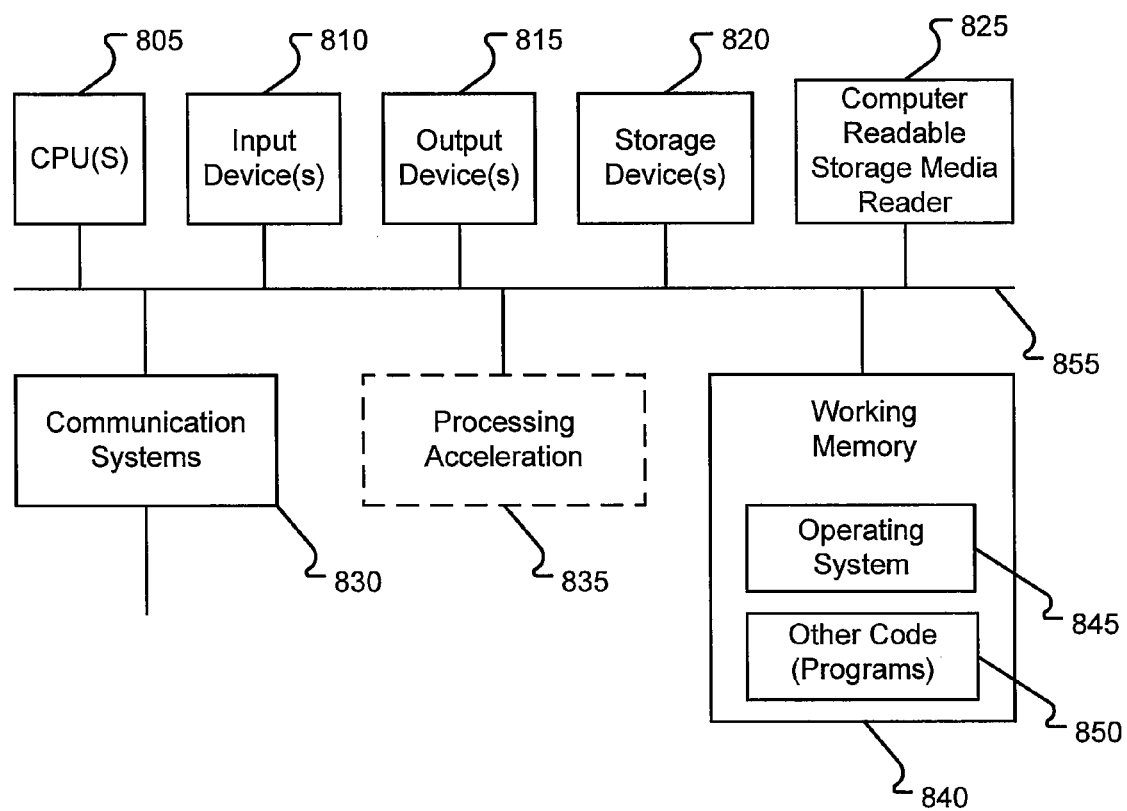
FIG. 8 is a block diagram of a computer system in which the systems and methods may be executed.

FIG. 8 illustrates one embodiment of a computer system 800 upon which the call processing server 202 and, in some embodiments, the internal communication endpoints 106, 108, or 110, external communication endpoints 118, 120, or 122, the application 114, or other systems or components described herein may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815 (e.g., a display device, a printer, etc.). The computer system 800 may also include one or more storage devices 820. By way of example, storage device(s) 820 may be disk drives, optical storage devices, solid-state storage devices such as a random access memory ("RAM") and/or a read-only memory ("ROM"), which can be programmable, flash-updateable and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. In some embodiments, the computer system 800 may also include a processing acceleration unit 835, which can include a DSP, a special-purpose processor, and/or the like.

The computer-readable storage media reader 825 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The communications system 830 may permit data to be exchanged with the network 820 and/or any other computer described above with respect to the system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 800 may also comprise software elements, shown as being currently located within a working memory 840, including an operating system 845 and/or other code 850, such as program code implementing the ancillary server 300. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

The invention claimed is:

1. A computer program product including computer executable instructions stored onto a computer readable medium which, when executed by a processor of a computer, cause the computer to perform method, the instructions comprising:

instructions to receive a request from an external communication endpoint to establish a communication with an internal communication endpoint, wherein the communication is on a gateway of an internal network, wherein the internal network is a SIP communications system;

instructions to receive a phone number associated with the external communication endpoint;

instructions to instantiate a promiscuous user agent on the gateway for the communication, wherein the promiscuous user agent is associated with the external communication endpoint;

instructions to determine whether a user identity is associated with the phone number;

if a user identity is associated with the phone number, instructions to provide the user identity to the promiscuous user agent, wherein the promiscuous user agent becomes a quantum user agent after receiving the user identity;

if a user identity is not associated with the phone number or after providing the user identity to the promiscuous user agent, instructions to begin the communication.

2. The computer program product as defined in claim 1, wherein the user identity is an address-of-record.

3. The computer program product as defined in claim 2, wherein determining a user identity for the external communication endpoint comprises:

an incoming call mapping service searching for the phone number: and upon finding the phone number, the incoming call mapping service retrieving the associated address-of-record.

4. The computer program product as defined in claim 3, further comprising:

the user agent publishing the address-of-record and a contact address with a DSC/ESC;

the DSC/ESC reporting the address-of-record and the contact address to an application; and wherein, the promiscuous user agent can receive a SIP primitive from the application, wherein the SIP primitive is directed to the contact address of the promiscuous user agent.

5. The computer program product as defined in claim 1, wherein the internal communication device is a SIP-enabled phone.

6. A method, comprising:

receiving a request from an external communication endpoint to establish a communication with an internal communication endpoint, wherein the communication is on a gateway of an internal network, wherein the internal network is a SIP communications system;

receiving a phone number associated with the external communication endpoint;

instantiating a promiscuous user agent on the gateway for the communication, wherein the promiscuous user agent is associated with the external communication endpoint;

determining whether a user identity is associated with the phone number;

when a user identity is associated with the phone number, providing the user identity to the promiscuous user agent, wherein the promiscuous user agent becomes a quantum user agent after receiving the user identity; and when a user identity is not associated with the phone number or after providing the user identity to the promiscuous user agent, beginning the communication.

7. The computer program product as defined in claim 6, wherein the user identity is an address-of-record.

8. The method as defined in claim 7, wherein determining a user identity for the external communication endpoint comprises:

an incoming call mapping service searching for the phone number: and upon finding the phone number, the incoming call mapping service retrieving the associated address-of-record.

9. The method as defined in claim 8, further comprising:

the user agent publishing the address-of-record and a contact address with a DSC/ESC;

the DSC/ESC reporting the address-of-record and the contact address to an application; and wherein, the promiscuous user agent can receive a SIP primitive from the application, wherein the SIP primitive is directed to the contact address of the promiscuous user agent.

10. The computer program product as defined in claim 6, wherein the internal communication device is a SIP-enabled phone.

11. A system, comprising:

a processor operable to:

receive a request from an external communication endpoint to establish a communication with an internal communication endpoint, wherein the communication is on a gateway of an internal network, wherein the internal network is a SIP communications system;

receive a phone number associated with the external communication endpoint;

instantiate a promiscuous user agent on the gateway for the communication, wherein the promiscuous user agent is associated with the external communication endpoint;

determine whether a user identity is associated with the phone number;

when a user identity is associated with the phone number, provide the user identity to the promiscuous user agent, wherein the promiscuous user agent becomes a quantum user agent after receiving the user identity; and when a user identity is not associated with the phone number or after providing the user identity to the promiscuous user agent, begin the communication.

12. The system as defined in claim 11, wherein the user identity is an address-of-record.

13. The system as defined in claim 12, wherein determining a user identity for the external communication endpoint comprises:

an incoming call mapping service searching for the phone number: and upon finding the phone number, the incoming call mapping service retrieving the associated address-of-record.

14. The system as defined in claim 13, further comprising:

the user agent publishing the address-of-record and a contact address with a DSC/ESC;

the DSC/ESC reporting the address-of-record and the contact address to an application; and wherein, the promiscuous user agent can receive a SIP primitive from the application, wherein the SIP primitive is directed to the contact address of the promiscuous user agent.

15. The system as defined in claim 11, wherein the internal communication device is a SIP-enabled phone.

* * * * *